United States Patent [19]

Ghest et al.

[11] 3,878,985

[45] Apr. 22, 1975

[54] SERIAL-PARALLEL MULTIPLIER USING BOOTH'S ALGORITHM WITH COMBINED CARRY-BORROW FEATURE

[75] Inventors: Robert C. Ghest, Saratoga; John S. Springer, Los Gatos, both of Calif.

[73] Assignee: Advanced Micro Devices, Inc., Sunnyvale, Calif.

[22] Filed: Nov. 30, 1973

[21] Appl. No.: 420,397

[52] U.S. Cl. .......... 235/164
[51] Int. Cl. .......... G06f 7/54
[58] Field of Search .......... 235/164

[56] References Cited

UNITED STATES PATENTS

| | | | |
|---|---|---|---|
| 3,192,363 | 6/1965 | MacSorley | 235/164 |
| 3,737,638 | 6/1973 | Esteban | 235/164 |
| 3,761,699 | 9/1973 | Sather | 235/164 X |
| 3,805,043 | 4/1974 | Clary | 235/164 |

OTHER PUBLICATIONS

Y. Chv, Digital Computer Design Fundamentals, McGraw-Hill, 1962, pp. 32–33.

S. Bandyopadhyay et al., "An Iterative Array for Mult. of Signed Binary Numbers," IEEE Trans. on Computers, Aug. 1972, pp.921–922.

*Primary Examiner*—Eugene G. Botz
*Assistant Examiner*—David H. Malzahn
*Attorney, Agent, or Firm*—Jerald E. Rosenblum; Thomas Schneck, Jr.

[57] ABSTRACT

A high speed hardware digital cell to be used in an iterative array for multiplication of signed and unsigned numbers. The multiplier takes the whole multiplicand in parallel and utilizes a single bit at a time of the multiplier to form partial products using the same logic gates to store both carry and borrow bit information which is utilized in add/subtract and shift multiplication.

12 Claims, 12 Drawing Figures

| $Y_n$ | $Y_{n-1}$ | OPERATION | BOOTH'S ALGORITM HARDWARE COMMAND |
|---|---|---|---|
| 0 | 0 | $\Pi_n = 1/2\ \Pi_{n-1}$ | NO CHANGE, SHIFT |
| 1 | 0 | $\Pi_n = 1/2\ (\Pi_{n-1} - X)$ | SUBTRACT, SHIFT |
| 1 | 1 | $\Pi_n = 1/2\ \Pi_{n-1}$ | NO CHANGE, SHIFT |
| 0 | 1 | $\Pi_n = 1/2\ (\Pi_{n-1} + X)$ | ADD, SHIFT |

FIG. 5

| $Y_n$ | $Y_{n-1}$ | PREVIOUS ARITHMETIC OPERATION | SIGN OF CURRENT $C_{m,n-1}$ | REQUIRED OPERATION | SIGN OF NEW $C_{m,n}$ |
|---|---|---|---|---|---|
| 0 | 0 | ADDITION | + | $\Pi_{m,n} = S_{m+1,n-1} + C_{m,n-1}$ | + |
| 1 | 0 | ADDITION | + | $\Pi_{m,n} = S_{m+1,n-1} - X_m + C_{m,n-1}$ | − |
| 1 | 1 | SUBTRACTION | − | $\Pi_{m,n} = S_{m+1,n-1} + C_{m,n-1}$ | − |
| 0 | 1 | SUBTRACTION | − | $\Pi_{m,n} = S_{m+1,n-1} + X_m + C_{m,n-1}$ | + |

FIG. 6

$$C_{m,n} = (X_m \cdot (CY_n \oplus Y_{n-1}) \oplus C_{m,n-1})) \cdot (S_{m+1,n-1} \oplus Y_n)$$
$$= ((X_m \cdot (Y_n \oplus Y_{n-1})) \oplus C_{m,n-1}) \cdot (S_{m+1,n-1} \oplus Y_n)$$
$$S_{m,n} = S_{m+1,n-1} \oplus C_{m,n-1} \oplus (X_m \cdot (Y_n \oplus Y_{n-1}))$$

WHERE $X_m$ IS A MULTIPLICAND BIT
$Y_n$ IS A MULTIPLIER BIT
$m$ IS THE CELL POSITION OF THE $m$TH MULTIPLICAND BIT OF X
$n$ IS THE TIME OF ARRIVAL OF THE $n$TH MULTIPLIER BIT OF Y
$S_{m,n}$ IS A SUM BIT AT POSITION $m$, TIME $n$
$C_{m,n}$ IS A CARRY BIT AT POSITION $m$, TIME $n$
$S_{m+1,n-1}$ IS SUM BIT FROM POSITION $m+1$, FROM PREVIOUS TIME CYCLE $n-1$
$C_{m,n-1}$ IS A CARRY BIT AT POSITION $m$, FROM PREVIOUS TIME CYCLE $n-1$

FIG. 7

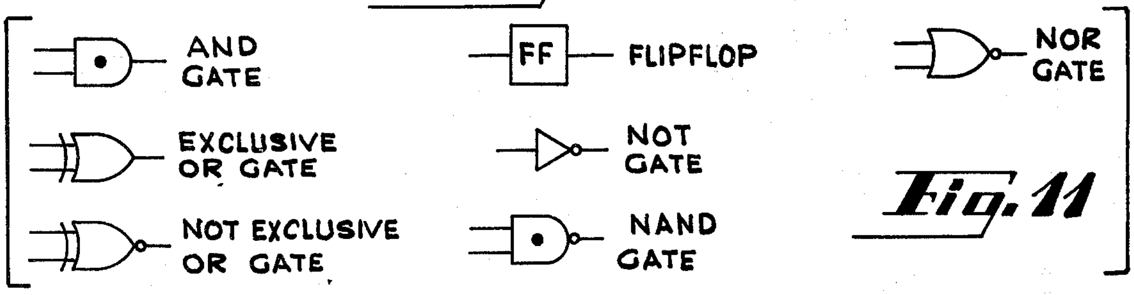

FIG. 11

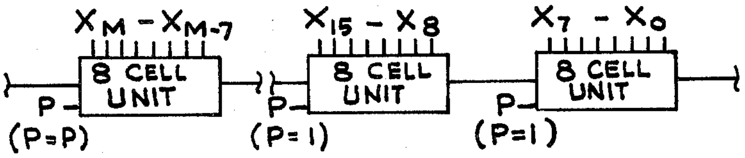

FIG. 12

SERIAL-PARALLEL MULTIPLIER USING BOOTH'S ALGORITHM WITH COMBINED CARRY-BORROW FEATURE

FIELD OF THE INVENTION

The invention relates to digital multipliers and more particularly to a high speed serial-parallel multiplier.

PRIOR ART

In previous multipliers which operated upon binary numbers of words in parallel, the time to propagate a carry unit across the bits of a multiplicand increased as word length increased. Carry skip-ahead multipliers have been developed which achieve higher speed, but at the expense of additional hardware which implements the logic for detecting whether carry skip-ahead conditions exist.

While it is desirable to have the speed of parallel multipliers with carry skip-ahead logic, it is undesirable to have the additional hardware required by prior art schemes, especially since the amount of hardware tends to increase geometrically with word length. On the other hand, if no skip-ahead logic is used the carry propagation time increases with increased word length thereby slowing the multiplication.

An object of the invention is to provide a high speed multiplier which results in optimum compromise between high speed and minimum hardware.

SUMMARY OF THE INVENTION

The invention is a serial-parallel multiplier, i.e., an apparatus which takes multiplicands in parallel, but which takes the multiplier one bit at a time. Such a device is especially useful in apparatus involving data communications wherein the multiplicand is a constant stored, for example, in a computer memory and the multiplier is arriving bit by bit over a communications channel. Thus, the constant can be multiplied bit by bit and partial products formed as each multiplier bit arrives. A final product would then be available not much later than the time that the last bit arrived and was processed.

Bit by bit multiplication described above processes the carry operation within the same cell rather than propagating it as usually done. This is achieved by temporarily storing a carry or borrow bit in a flipflop until after the partial product formed is shifted one place towards the least significant bit, (LSB). The carry or borrow bit is then reinserted in the same bit position into a full adder which also accepts the next more significant bit from the previous operation and the multiplicand bit.

A multiplier cell configuration has been devised for handling both borrow and carry bits with the same minimal hardware in the multiplication of unsigned and signed numbers. All multiplier cells are the same, except for a small change in the most significant bit (MSB) cell hardware.

Booth's algorithm is implemented to skip multiplications in individual cells when successive multiplier bits are identical successive multiplications with identical multiplier bits are skipped until the next multiplier bit to be processed is different from the preceding one.

DESCRIPTION OF THE FIGURES

FIG. 5 is a table summarizing Booth's algorithm.

FIG. 6 is a table of the combinations of variables for forming partial products with a single carry or borrow bit.

FIG. 7 is a table summarizing the logic expressions which satisfy criteria for a multiplier wherein borrow and carry bits can be handled by the same hardware.

FIG. 11 is a diagram of symbols used in FIGS. 8, 9 and 10.

FIG. 12 is an interconnection plan for a plurality of multiplier cells.

DESCRIPTION OF THE PREFERRED EMBODIMENT

Figure 1:
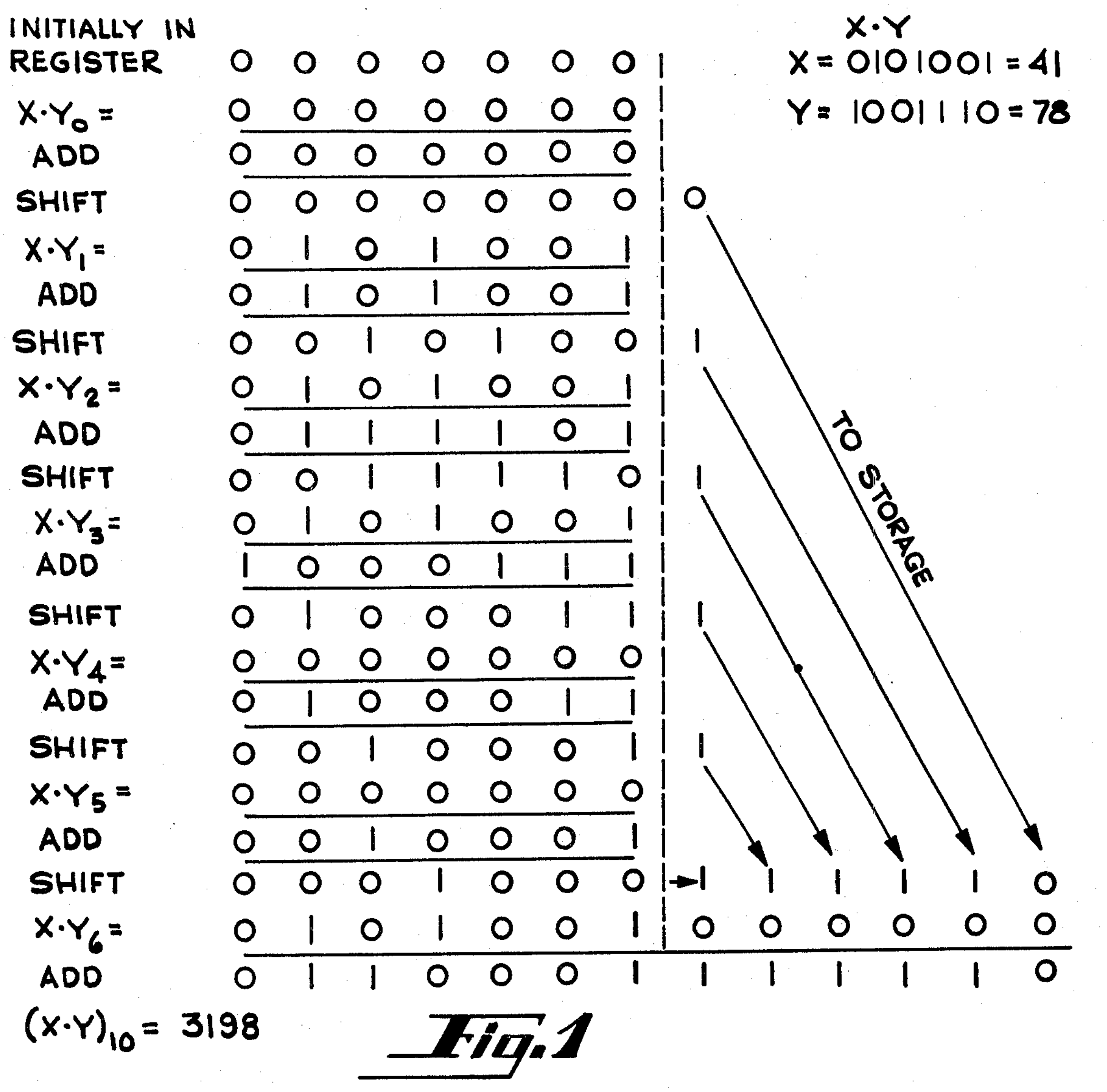
FIG. 1 is a numerical example for conventional add and shift binary multiplication.

Hardware cells of the type used in digital multiplication perform multiplication by means of a series of additions, starting with a first partial product formed by multiplying the least significant bit (LSB) of the multiplier by the multiplicand. The result is a partial product which is added to the previous partial product, if any, and then the result is divided by two (shifted one place). The next significant bit of the multiplicand is multiplied by the multiplier to form the next partial product which is added to the previous partial product which has been shifted. This process continues to the most significant bit (MSB) of the multiplier. FIG. 1 shows a table for forming the product of two numbers, X and Y, where X=0101001 and Y=1001110 where the least significant bit is on the right. In decimal notation x=41 and Y=78 and their product is 3198.

In the example of FIG. 1, the bits of X from LSB to MSB may be labelled as follows: $X_0 = 1$, $X_1 = 0$, $X_2 = 0$, $X_3 = 1$, $X_4 = 0$, $X_5 = 1$, $X_6 = 0$. Correspondingly, $Y_0 = 0$, $Y_1 = 1$, $Y_2 = 1$, $Y_3 = 1$, $Y_4 = 0$, $Y_5 = 0$, $Y_6 = 1$.

In FIG. 1, multiplication of X by Y by a bit by bit add and shift process is illustrated on paper as it would be carried out in a conventional add and shift multiplier. Note that the complete multiplicand X is multiplied by one bit of the multiplier, Y. After each multiplication by a bit of Y the partial product is added to any previous partial product and then shifted to the right. The digit which is shifted out of the register which holds the partial products is sent to storage for formation of the final result.

The seven leftmost bits of the total in FIG. 1 must be written into the auxillary storage at the conclusion of the multiplication, and this will require additional time. More generally, if an m-bit multiplicand is multiplied by a n-bit multiplier, the multiplication and storage will require n clock intervals and an additional m intervals will be required to obtain the m most significant bits of the product.

Figure 2:
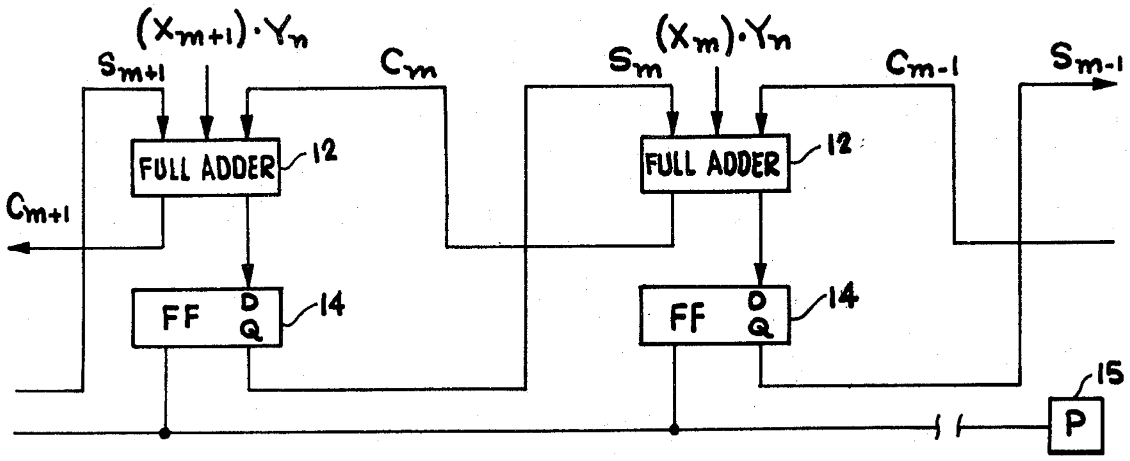
(PRIOR ART) Fig. 2
FIG. 2 is a schematic representation of one of the conventional hardware configurations for add and shift multiplication.

The hardware implementation of the process illustrated in FIG. 1 is shown in FIG. 2 which shows cells for handling two consecutive bits. Each cell consists of a one bit full adder 12 and a D-type flipflop 14 used for storing the previously generated bit of the partial product or subtotal. A D-type flipflop 14 is characterized by a single data input and a clock input. After receiving a clock pulse from pulser 15, the output of a D-type flipflop is the same as the input just prior to the clock pulse.

$S_m$ and $X_m$ are the mth bit of the partial product and of the multiplicand, respectively, and $C_m$ is the carry information generated at the mth bit to be added to bit $m+1$. $C_m = 1$ exists if a carry is called for and $C_m = 0$ otherwise. $Y_n$ is the current multiplier bit, and is the same at all cells.

Note that the carry operation occurs for each partial product bit with carries propagating from right to left from the LSB to the MSB. Thus, in the method described above, the time required for forming each partial product increases with the word length of numbers to be multiplied. Our object is to reduce this time insofar as possible.

Carry-Save Operation

By treating carry operations in parallel in the formation of each partial product, the propagation time for the carry stream is substantially reduced. In considering FIG. 1 it will be seen that if instead of adding a carry digit before shifting right, the carry is added in the same bit position after a shift right has occurred, the same result may be achieved as in FIG. 1.

Figure 3:
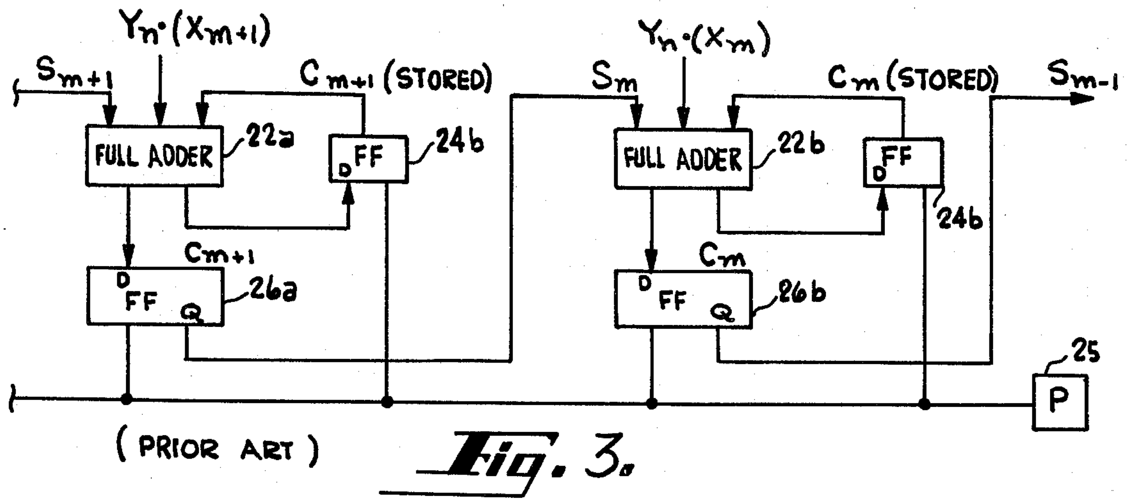
(PRIOR ART) Fig. 3.
FIG. 3 is a schematic representation of one of the known hardware configurations for add and shift multiplication utilizing a carry-save flipflop.

FIG. 3 shows a known hardware implementation of this approach for two consecutive cells. The key difference between the apparatus in FIG. 2 and the apparatus in FIG. 3 is that the carry bit generated by the full adder 22*a* is stored in the D-type flipflop 24*a* and then reinserted into adder 22*a* after a clock pulse is received from the pulser 25. A partial product generated by the adder 22*a* is stored with a carry in a flipflop 24*a* with the sum stored in the D-type flipflop 26*a* for one clock cycle. The sum is then shifted, i.e., fed into the adder 22*b* in the next cell for combination with the multiplicand and a carry which has been saved from the preceding cycle. This is shown in FIG. 3 where the full adder 22*b* receives the sum input $S_m$, and multiplicand input bit $X_m$ and the saved carry bit from the previous operation $C_m$ (stored), the latter bit having been stored in flipflop 24*b* until gated by a clock pulse from a pulser 25. From the adder 22*b* the sum flows to the input of D-type flip-flop 26*b* where it remains until stored in flipflop 26 by the next clock pulse from the pulser 25 and thereupon the result is fed to the next cell.

The effect of having carry information, $C_m$, stored in a flipflop 24*b*, and then added to $S_m$ and $X_m$ is that the carry information has been used after the shift operation has occurred. At anytime, the true partial product is the sum of the words stored in the flipflops 24 and 26. In this way, the carry stream is effectively truncated so that it has length 1 and the carry operations may be accomplished in parallel at each stage of formation of the partial product without auxiliary hardware to take account of successively more complex carry logic. The small increase in hardware necessary to achieve this savings is the addition of one flipflop to each cell. However, all cells except the MSB cell in each unit are uniformly structured so that for practical word lengths no increase in complexity of the individual cell occurs. A "unit" here is a sequence of cells (here, eight in number) consecutively strung together for computation and convenience of fabrication.

Booth's algorithm

Multiplication by a signed, i.e., positive or negative multiplier, represented in 2's complement format, requires that the bit which carries the sign information, the MSB, must be treated differently. This situation is eased by adopting Booth's algorithm for the multiplication of two numbers. To implement Booth's algorithm, all numbers are written in the 2's complement notation so that for a word that is eight bits long, integers between −128 and +127 may be represented.

At this point it would be well to review 2's complement notation. This is a weighted format for representing both positive and negative numbers in binary code. This weighting is preferred because it allows the present apparatus to deal with both positive and negative numbers without additional hardware. In 2's complement notation, the MSB is taken as a negative number if the bit is a binary one (rather than zero). For example, if the binary work length is eight bits and the MSB is one, then the MSB represents a negative 128 and the remaining bits represent decreasing positive powers of 2 from the digit to the right of the MSB to the LSB, which are to be added to negative 128. In other words, for a binary word eight bits long the word is weighted in the binary code −128, 64, 32, 16, 8, 4, 2, 1. In this code, every decimal integer from −128 to +127 may be represented uniquely.

Figure 4:
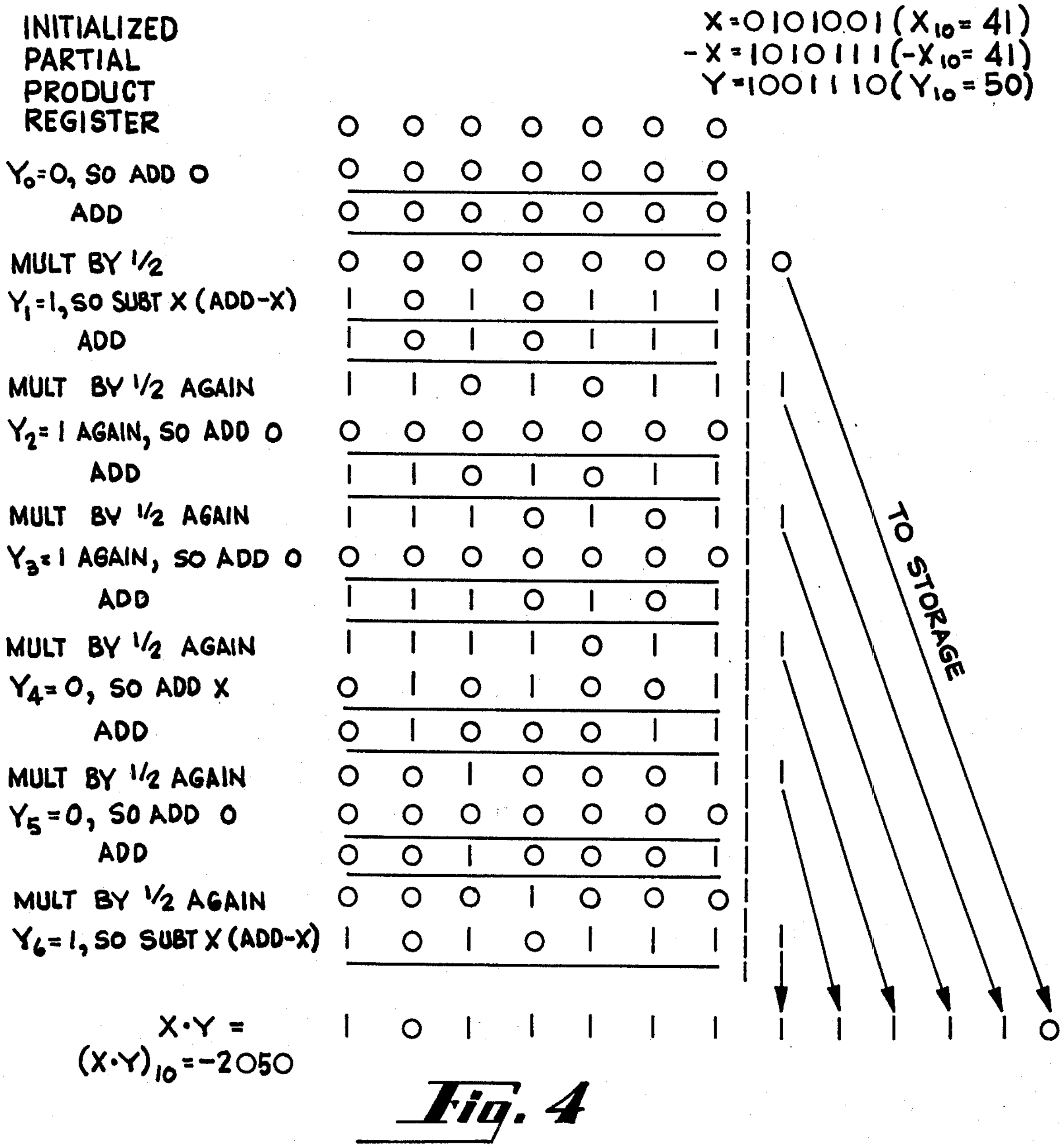
FIG. 4 is a numerical example for conventional two's complement multiplication using Booth's algorithm.

Given two binary numbers, X and Y, using the previous examples given with respect to FIG. 1, multiplication with Booth's algorithm proceeds as follows. If the first multiplier bit $Y_0 = 0$, add 0 since $Y_0 \cdot X = 0$, taken bit by bit. If $Y_0 = 1$, subtract X. Given that the $n$-1 multiplier bit $Y_{n-1}$ has been processed, if $Y_{n-1}$ coincides with $Y_n$, i.e., $Y_{n-1} = Y_n = 0$, or $Y_{n-1} = Y_n = 1$, add 0 to the partial product and move to the next higher bit in Y. If $Y_{n-1} \neq Y_n = 0$, multiply X on a bit by bit basis, by $2^n$ and add. If $Y_{n-1} \neq Y_n = 1$, multiply X by $2^n$ and subtract. Multiplication of X by successive powers of 2 occurs automatically in the shift operation. Operation of the algorithm with the use of the numbers X and Y as previously described is illustrated in the numerical example of FIG. 4.

Booth's algorithm can afford a saving in computation time, since wherever strings of consecutive 0's or 1's appear, the apparatus can merely shift right and ignore any addition or subtraction or operations after the first element in the string. However, the primary advantages of the use of Booth's algorithm here are that it: 1) simplifies the multiplication of 2's complement numbers, 2) gives the correct 2's complement partial product stage-by-stage, and 3) allows a uniform treatment of all bits, except the "sign" bit (MSB) of the multiplicand which differs but little from the remainder. Booth's algorithm has been previously known, as well as the add and shift process previously described.

In implementing Booth's algorithm, one must deal with both carry and borrow operations. In the present invention, the same apparatus can be used for both carry and borrow functions, achieving a substantial savings in computer hardware while at the same time taking advantage of time savings as previously described with regard to the serialparallel multiplication process. The apparatus described hereunder permits both borrow and carry operations to be performed by the same hardware as well as enabling operations to be performed in parallel for all multiplicand bits.

The subscript notation used below is to be understood as follows. The present apparatus is a serial-parallel multiplier in which multiplicand bits are taken in parallel by a multiplicity of identical cells. Thus, the cells numbered . . . . $m-1$, $m$, $m+1$. . . .corresponding to similarly numbered multiplicand bits . . . , $X_{m-1}$, $X_m$, $X_{m+1}$, . . .respectively. Thus, the subscript $m$ relates to position of cells and bits identified with those cells.

The apparatus accepts multiplier bits serially, i.e., one at a time with the present time interval designated $n$, the previous interval $n-1$ and the next future interval $n+1$. Thus, the serial bit stream of the multiplier is numbered . . . $Y_{n-1}$, $Y_n$, $Y_{n+1}$ . . . In a synchronous system the time intervals, $n-1$, $n$, $n+1$, are determined by a clock pulser which produces a series of pulses which are received by registers and flipflops which change state and cause a change of bit position in a well known manner. In an asynchronous system the time intervals are determined by other means. The present apparatus is shown to be a synchronous system, but this is a matter of choice. The manner in which time intervals are derived is not important.

When double subscripts are used, e.g., $S_{m,n-1}$, reference is made to a bit whose position is identified with cell position $m$ and whose time of origin occurred or will occur in the time interval $n-1$.

Hardware Implementation of Booth's Algorithm

At any time period $n$, $Y_n$ is the present bit of the multiplier Y and $Y_{n-1}$ is the previous bit, preserved in a flipflop; $S_{m,n-1}$ is the mth bit of the sum $S_{n-1}$ generated during the previous time cycle, $n-1$; and $S_{m,n}$ is the new mth bit of the partial sum $S_n$ at a time $n$ after operation with $Y_n$. $C_{m,n}$ is the mth bit of the partial carry $C_n$ generated during the time period $n$. $\pi_n$ is the true partial product at time $n$ and is defined as the sum of $C_n$ and $S_n$.

Booth's algorithm is implemented by the operations described in FIG. 5. The commands of FIG. 5 can be determined from the $Y_n$ input by means of an EXCLUSIVE OR gate and a flipflop, specifically with reference to EXCLUSIVE OR gate 34 and flipflop 32 in FIGS. 8 and 9.

In using hardware to carry out the operations responsive to the commands in FIG. 5 on a bit by bit basis, it is desirable that the operations designated by the equations $\pi_n = 1/2\ (\pi_{n-1} \pm X)$ be accomplished in a single time interval by hardware which eliminates the need to propagate carries to the next higher cell, but rather inserts the carry back into the adder unit of the cell after a shift to the right.

Logic Design for a New Multiplier

FIG. 6 shows the required combinations of the adder unit variables $S_{m+1,n-1}$, $C_{m,n-1}$, $X_m$ given various combinations of $Y_n$ and $Y_{n-1}$. In FIG. 6 the column labeled Previous Arithmetic Operation is derived from the rules of Booth's algorithm previously stated. Since the operations alternate between addition and subtraction, the previous operation must be the opposite of the next operation with regard to X as illustrated in the numerical example of FIG. 4.

In FIG. 6, the sign rules for implementing Booth's algorithm are set forth. Specifically the sign rules govern whether a carry bit, e.g., $C_{m,n-1}$ carries positive or negative weight, i.e., whether the carry bit is a carry to be added or a borrow to be subtracted. If the present multiplier bit $Y_n$=0 then the previous arithmetic operation involving Booth's algorithm was an addition of $X_m$, so that the carry bit produced, $C_m$, has a positive weight and should be added in a subsequent cycle. This rule is set forth in line 1 of FIG. 6.

If the present multiplier bit $Y_n$=1, and the previous multiplier bit $Y_{n-1}$=0, then the previous arithmetic operation involving Booth's algorithm was also an addition. In such a case, $C_m$ is added as set forth in line 2 of FIG. 6.

If the present multiplier bit $Y_n$=1 and the previous multiplier bit $Y_{n-1}$=1, then the previous arithmetic operation involving Booth's algorithm was a subtraction of $X_m$, so that the carry bit produced, $C_m$, carries negative weight and should be subtracted from the partial product. This rule is set forth in line 3 of FIG. 6.

If the present multiplier bit $Y_n$=0 and the previous multiplier bit $Y_{n-1}$=1, then the previous arithmetic operation involving Booth's algorithm was a subtraction. In such a case $C_m$ carries negative weight and is subtracted from $S_{m+1}$ as set forth in line 4 of FIG. 6.

While FIG. 6 shows the required combinations of $S_{m+1,n-1}$, $C_{m,n-1}$ and $X_m$ for the mth multiplicand bit at time n, we have described only the mathematical rules for adding, subtracting and shifting. Since the technique described above requires that we operate with both the present and previous Y bits, two Y variables are present, $Y_n$ and $Y_{n-1}$. Thus, the bit by bit computation of the new binary sum $S_{m,n}$ and the new carry function $C_{m,n}$ involves five variables: $Y_{n-1}$, $Y_n$, $S_{m+1,n}$, $X_m$ and $C_{m,n-1}$, so that $2^5$ or 32 possibilities exist. However, of these 32, 8 possibilities cannot occur. These eight arise from the fact that when $X_m$=0, $C_{m,n-1}$ must equal 0. Thus one-fourth of the 32 situations may be eliminated. This restriction is expressed by the logical equation $\overline{X_m} \cdot C_{m,n-1}=0$ where $\overline{X_m}$ is the binary complement of $X_m$. The 24 remaining possibilities can be represented by a set of logic design equations which are shown in FIG. 7. These design equations are derived by an analysis of the various combinations of the five variables which are allowed. The design equations in FIG. 7 thus express one means for generating and utilizing both carry/borrow and partial product information on a bit by bit basis.

The equations of FIG. 7 represent the operations to be performed by the Multiplier for all but the MSB of the multiplicand. The MSB of X has a negative weight attached, i.e., $-2^{M-1}$ if X is a word having a total length of M bits.

The logic equations of FIG. 7 relate $S_{m,n}$ and $C_{m,n}$ to the five variables $Y_{n-1}$, $Y_n$, $S_{m+1,n-1}$, $Y_m$ and $C_{m,n-1}$; and of the 32 possibilities only 24 situations occur, represented by the equations in FIG. 7. In dealing with the MSB, $m$ is replaced by M in FIG. 7. One further change is that $S_{m+1,n-1}$ is replaced by $S_{M+1,n-1}$ in the equation for $C_{M,n}$.

Hardware Implementation of the Logic Design

Figure 8:
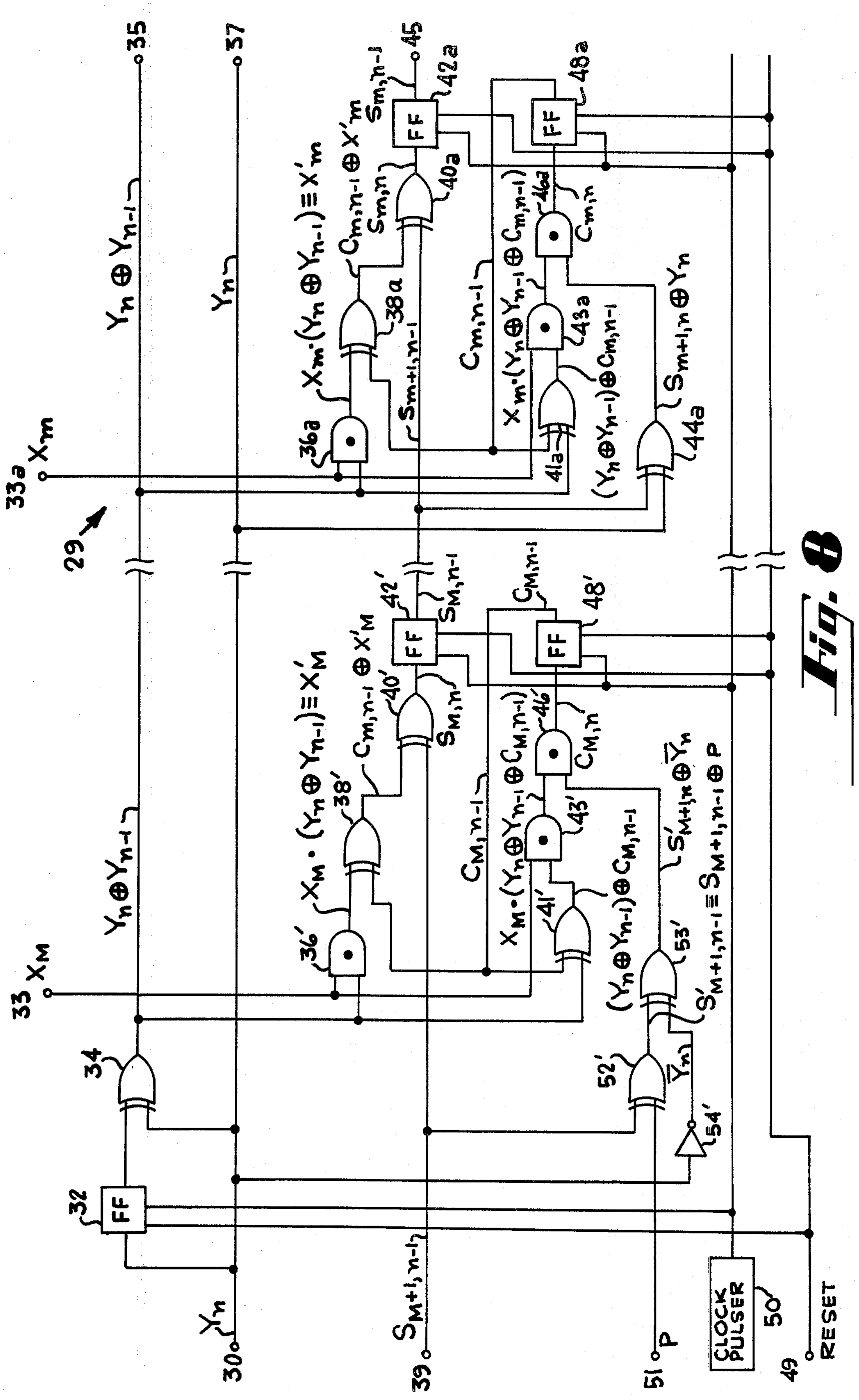
FIG. 8 is a schematic diagram of a hardware implementation of the logic expressions of FIG. 7.

In FIG. 8 the equations of FIG. 7 have been implemented by hardware for a single cell, designated as the mth cell 29. The symbols used in FIG. 8 are conventional symbols, but are nevertheless explained in FIG. 11. It will be realized that the gates shown in FIG. 11 are well known arrangements of components such as transistors, resistors and the like. The components need not be discrete; they may be fabricated by means of integrated circuit technology. In fact, the uniformity of cells of the present apparatus allows a large number of cells to be connected together on a single chip using integrated circuit technology.

With respect to FIG. 8, an input multiplier bit $Y_n$ arrives at terminal 30 whereupon it proceeds to the first EXCLUSIVE OR gate 34 where it is combined with a $Y_{n-1}$ bit which has been stored from the previous clock cycle in the first flipflop 32. When the first flipflop 32 is pulsed by the pulser 50, the signal $Y_n$ is stored in the flip-flop and applied to EXCLUSIVE OR gate 34. The output of gate 34 is the quantity $Y_n \oplus Y_{n-1}$ used in implementation of Booth's algorithm as described above. The result is transmitted to terminal 35 and to the first AND gates 36, 36a for multiplication by the X input, $X_M \ldots X_n$ from terminal 33. Note that flipflop 32 and gate 34 are needed only once for all cells. Similarly, the clock pulser 50 is needed only once.

First, consider the operation of a cell handling a bit other than the MSB of X, i.e., $X_m$. The output of gate 36a is $X_m \cdot (Y_n \oplus Y_{n-1})$ which is designated $X'_m$. $X'_m$ goes to the second EXCLUSIVE OR gate 38a for the formation of $C_{m,n-1} \oplus X'_m$. $C_{m,n-1}$ was gated out of third flipflop 48a on the previous clock pulse. The product from gate 38a in turn goes to the third EXCLUSIVE OR gate 40a for combination with the partial product $S_{m+1,n-1}$. The result, $S_{m,n}$ enters second flipflop 42a for storage when it is gated by pulser 50. When a signal is received from pulser 50, the output of second flipflop 42a is available as output $S_{m,n-1}$ to the next less significant cell.

Next, consider operation of the cell handling the MSB of X, i.e., $X_M$. The output of gate 36 is $X_M \cdot (Y_n \oplus Y_{n-1})$ which is designated $X'_M$. $X'_M$ goes to the second EXCLUSIVE OR gate 38 for the formation of $C_{M,n-1} \oplus X'_M$. The bit $C_{M,n-1}$ was gated out of third flipflop 48 on the previous clock pulse. The result from gate 38 in turn goes to the third EXCLUSIVE OR gate 40 for combination with the partial product $S_{M+1,n-1}$. The result, $S_{M,n}$ enters second flipflop 42 for storage when it is gated by pulser 50. When a signal is received from the pulser 50, the output of second flipflop 42 is available as output $S_{M,n-1}$ to the next less significant cell.

Simultaneously, the quantity $Y_n$ as formed at the second NOT gate 54 is applied through the first EXCLUSIVE NOR gate 53, together with the modified partial product $S_{M+1,n-1} \oplus P$, defined as $S'_{M+1,n-1}$, from terminals 39 and 51, to form the quantity $S'_{M+1,n-1} \oplus \overline{Y}_n$. P is defined as the mode input, a bit which specifies whether signed or unsigned numbers are being multiplied. The appropriate choice of mode input P at the first EXCLUSIVE OR gate 52, a mode control means, produces the correct input to the AND gate 46. The mode control means P operates as follows. When P=0 at gate 52 the MSB of X, i.e., $X_M$, is treated as carrying negative weight. When P=1 the MSB of X, $X_M$, is treated as carrying positive weight. In either case, constants may be added at terminal 39 as the input $S_{M+1,n}$.

The quantity $(Y_n \oplus Y_{n-1}) \oplus C_{M,n-1}$ is formed by the third EXCLUSIVE OR gate 41, and this is combined with $X_M$ in the second AND gate 43 to form $X_M \cdot (Y_n \oplus Y_{n-1} \oplus C_{M,n-1})$. This last quantity is combined with $S'_{M+1,n-1} \oplus Y_n$ in the third AND gate 46 to form $C_{M,n}$ which is fed to the third flipflop 48. On the next clock pulse, $C_{M,n-1}$ is gated out of the flipflop as an input to the gates 38 and 41.

For all bit cells $m<M$, the inputs and operations of the gates 33, 34, 36a, 38a, 40a, 41a, 43a, 46a and of the flipflops 32, 42a, 48a are the same as for bit M. However, the treatment of $S_{m+1,n-1}$ for $m<M$ and $Y_n$ is different: $S_{m+1,n-1}$ and $Y_n$ (not $\overline{Y}_n$) are input to the fourth EXCLUSIVE OR gate 44a, resulting in the product $S_{m+1,n-1} \oplus Y_n$, which is then input to the third AND gate 46a together with $X_m \cdot (Y_n \oplus Y_{n-1} \oplus C_{m,n-1})$ and the computations proceed as before.

Figure 9:
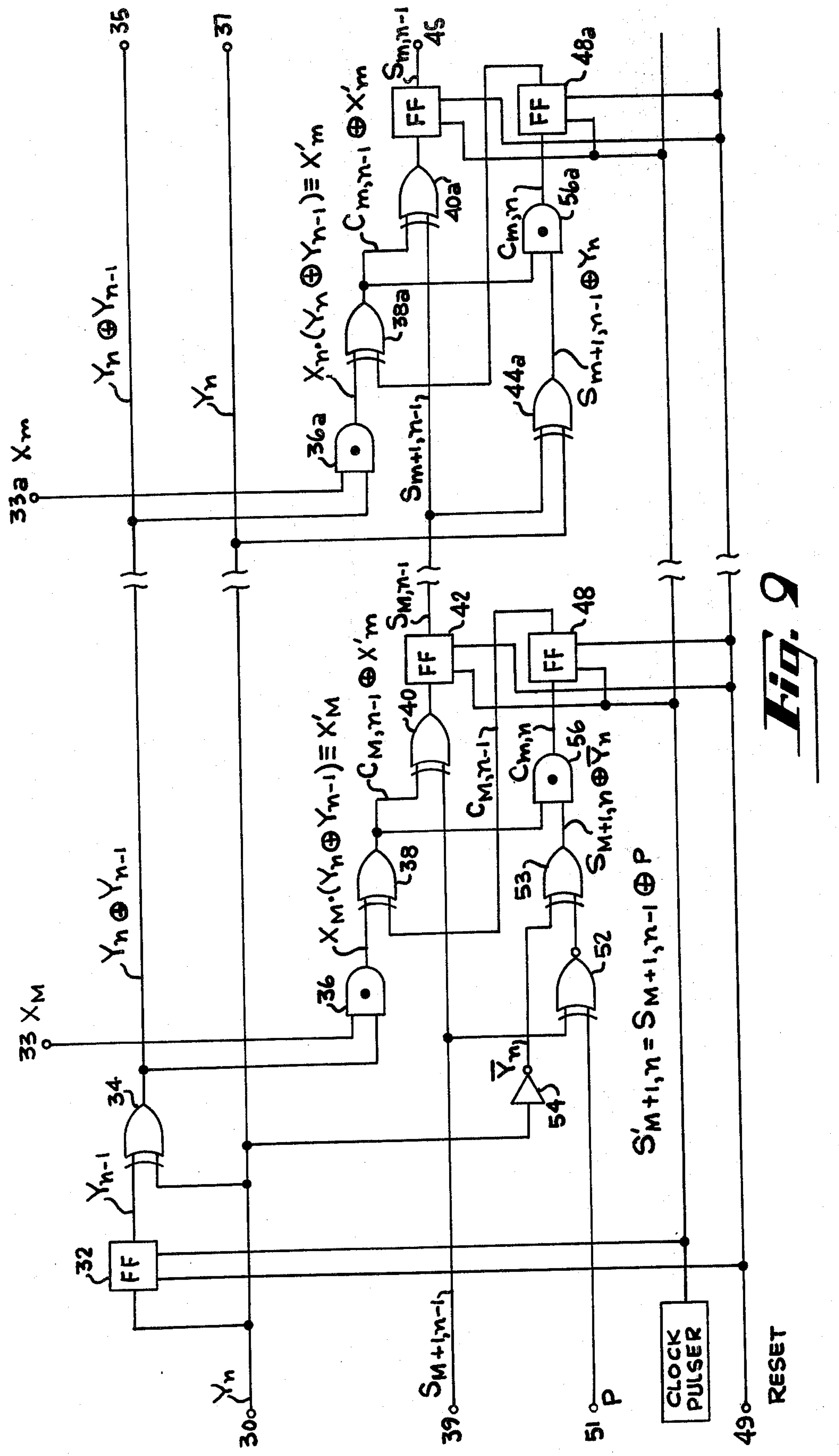
FIG. 9 is an alternate schematic diagram of the hardware of FIG. 8.

FIG. 9 is another version of FIG. 8 which allows a simpler hardware implementation, as a certain quantity common to the computation of $C_m$ and of $S_m$ is computed only once for each cell. An input multiplier bit $Y_n$ arrives at terminal 30 whereupon it proceeds to the first EXCLUSIVE OR gate 34 where it is combined with a $Y_{n-1}$ bit which has been stored from the previous clock cycle in the first flipflop 32. When the first flipflop 32 is pulsed by the pulser 50, the contents of the flipflop are shifted out into the first EXCLUSIVE OR gate 34. The output of gate 34 is the quantity $Y_n \oplus Y_{n-1}$. The result is transmitted to terminal 35 and to the first AND gate 36 for multiplication by the X input, $X_m$ from the terminal 33. Again, flipflop 32 and gate 34 and the clock pulser 50 are needed only once for all cells.

The output of gate 36 is $X_M \cdot (Y_n \oplus Y_{n-1})$ which is again designated $X'_M$ for purposes of abbreviation. $X'_M$ goes to the second EXCLUSIVE OR gate 38 for the formation of $C_{M,n-1} \quad X'_M$. The bit $C_{M,n-1}$ was stored in the third flipflop 48 on the previous clock pulse. The result from gate 38 in turn goes to the third EXCLUSIVE OR gate 40 for combination with the partial product $S_{M+1,n-1}$. The result enters second flip-flop 42 which is gated by pulser 50. The output of second flipflop 42 is fed as output $S_{M,n-1}$ to terminal 45 which is connected to the next cell. At the last cell, the partial result $S_{o,n-1}$ is stored temporarily in storage means not shown.

The input $Y_n$ is simultaneously passed through the first NOT gate 54 to form $\overline{Y}_n$. This is applied at the first EXCLUSIVE NOR gate 53 together with $S'_{M+1,n-1} = S_{M+1,n-1} \oplus P$ formed as in FIG. 8 to form $S'_{M+1,n-1} \oplus Y_n$. This last quantity and the output $X'_M \oplus C_{M,n-1}$ are fed as inputs to the second AND gate 56, whose output $C_{M,n}$ is stored in the third flipflop 48 by the next clock pulse from the pulser 50.

For all bit cells $m<M$ in a group of cells, the inputs and operations of the gates 33, 34, 36a, 40a, 56a and of the flip-flops 32, 42a, 48a are the same as for bit M, but the treatment of $S_{m+1,n-1}$ and $Y_n$ differs. $S_{m+1,n-1}$ and $Y_n$ are input to the fourth EXCLUSIVE OR gate 44a, the result $S_{m+1,n-1} \oplus Y_n$ is input to the second AND gate 56a and the computation proceeds as before.

Figure 10:
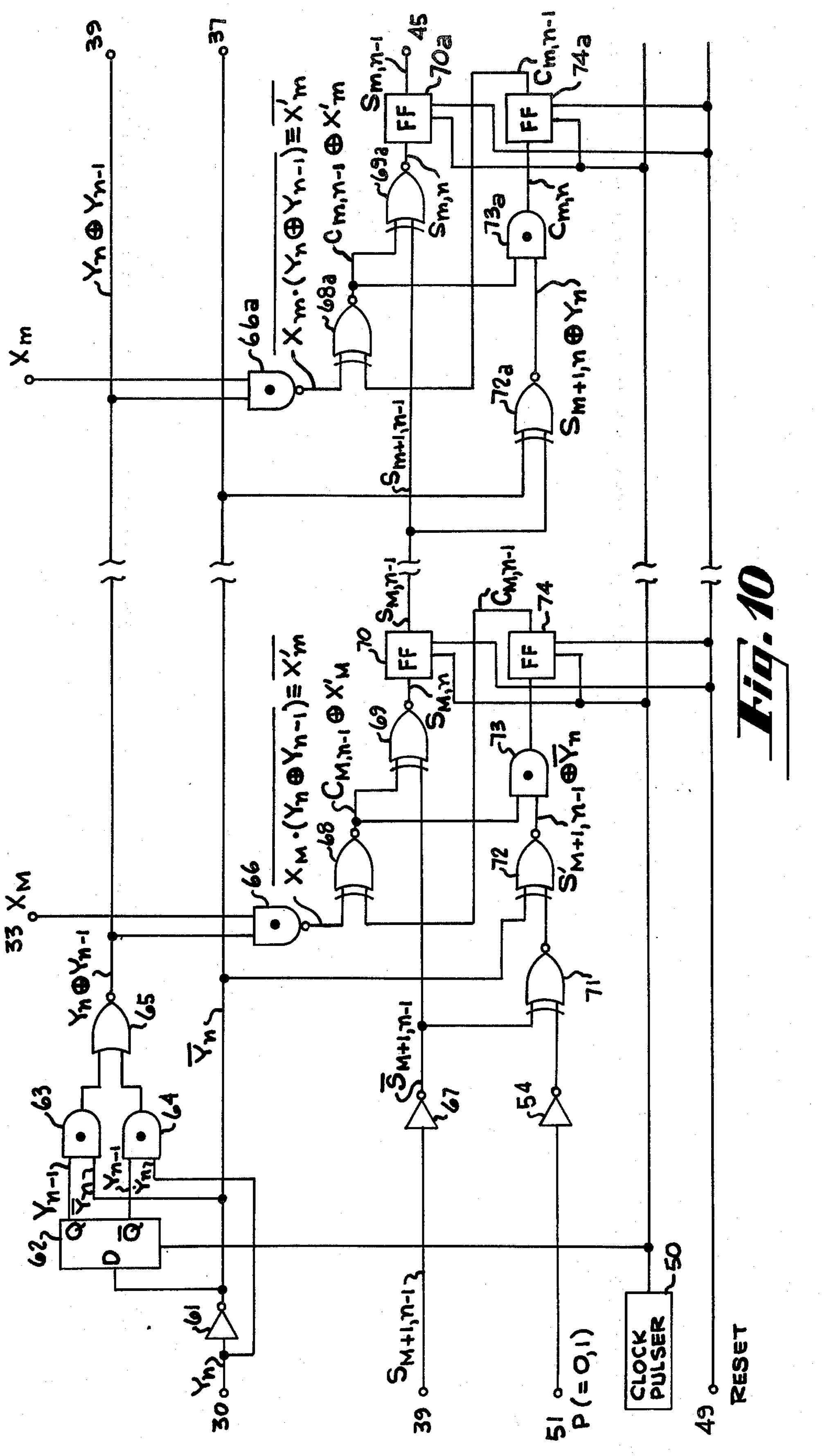
FIG. 10 is another alternate schematic diagram of the hardware of FIG. 8, especially suited for manufacture by integrated circuit technology.

FIG. 10 presents a hardware embodiment of the logical equations of FIG. 9 which is useful in an integrated circuit implementation. With reference to FIG. 10, an input $Y_n$ arrives at the first NOT gate 61 and $\overline{Y}_n$ is formed. At the next clock pulse, $\overline{Y}_{n-1}$ is gated from the first flipflop 62 and $\overline{Y}_n$ and $\overline{Y}_{n-1}$ are fed as inputs to the first AND gate 63 to form $\overline{Y}_n \cdot \overline{Y}_{n-1}$. Similarly, $Y_n$ and $Y_{n-1}$ are fed as inputs to the second AND gate 64 to form $Y_n \cdot Y_{n-1}$. The outputs of 63 and 64 are input to the NOR gate 65 to form $Y_n \oplus Y_{n-1}$, which is input to the first NAND gate 66 together with the multiplicand bit $X_M$. The signal $Y_n \oplus Y_{n-1}$ is also transmitted to terminal 35. The output of 66 is $\overline{X'_M} = \overline{X_M \cdot (Y_n \quad Y_{n-1})}$, and this together with the output $C_{M,n-1}$ from the third flipflop 74 is fed to the second EXCLUSIVE NOR gate 68 to form $X'_M \oplus C_{M,n-1}$. This together with $\overline{S}_{M+1,n-1}$ is fed to the third EXCLUSIVE NOR gate 69 to form $S_{M,n}$ which is stored in the second flipflop 70. At the next clock pulse, $S_{M,n-1}$ is transmitted to the next lower cell at terminal 45.

The output $\overline{S}_{M+1,n-1}$ of gate 67 is also input to the EXCLUSIVE NOR gate 71 to form $S'_{M+1,n-1} = S_{M+1,n-1} \oplus P$, which together with $Y_n$ is fed to the fourth EXCLUSIVE NOR gate 72 to form $S'_{M+1,n-1} + Y_n$. This output, together with the output $X'_M + C_{M,n-1}$ from gate 68 is input to the third AND gate 73 to form the result $C_{M,n}$ which is stored in the third flipflop 74.

For all lower significant bits ($m<M$) in a group of cells, the inputs and operations of the gates 61, 62, 63, 64, 65, 66*a*, 68*a*, 73*a* and of the flipflops 62, 70*a*, 74*a* are the same. Gate 69*a* is producing $\overline{S}_{M,n}$ (not $S_{m,n}$), so the sum is taken from the complement output of flipflop 70*a*. The input $S_{m+1,n-1}$ (not $\overline{S}_{m+1,n}$) and the bit $\overline{Y}_n$ are input to the fourth EXCLUSIVE NOR gate 72*a*, and the result is input to the third AND gate 73*a* together with $X'_m + C_{m,n-1}$ from 68*a*. All other computations proceed as before.

The apparatus of FIGS. 8, 9, 10 are deemed to be merely representative examples of several types of apparatus which may implement the equations of FIG. 8.

A plurality of cells such as that shown in FIG. 10 can be connected to a common pulser 50 and to common algorithm logic, 61, 62, 63, 64, 65 to perform multiplication on words of varying length. In each cell, a novel feature of the present invention is utilized, a single carry-save flipflop, 74, is arranged in a configuration of logic gates to handle both carry and borrow information in a digital multiplication apparatus.

FIG. 12 shows a grouping of cells which have been arranged in 8 cell units. Each unit comprises 8 cells which are identical except for the cell corresponding to the MSB, as described with reference to FIGS. 8, 9 and 10. The $S_{m+1}$ input of a lower unit is connected to the LSB cell of an adjacent upper unit. The number of units which may be interconnected is not limited to three as shown in the drawing. The number of needed cells is determined by the multiplicand word length and other operational considerations. Note that when the MSB of an 8 cell unit is not the MSB for the entire grouping of units, the mode control means is set to handle unsigned numbers. The MSB cell of the entire grouping is treated as previously described.

In FIGS. 8, 9 and 10 a reset means is connected to each flipflop to clear each flipflop when a signal is applied to the reset means. The flipflops are all cleared simultaneously when such a signal is applied.

We claim:

1. A digital multiplier of the type taking multiplicand bits in parallel, said multiplicand bits in two's complement notation, numbered in a bit position hierarchy as follows, $X_M, \ldots, X_{m+1}, X_m, X_{M-1}, \ldots X_1, X_0$ where M is a number designating the position of the most significant X bit, $m$ is a number designating the position of the $m$th bit, and 0 is a number designating the position of the least significant X bit, said multiplier taking multiplier bits serially least significant bit first with multiplier bits in two's complement notation, numbered in a time interval hierarchy as follows, $Y_N, \ldots, Y_{n+1}, Y_n, Y_{n-1}, \ldots Y_1, Y_0$, where N is a number designating the time of occurrence of the least significant Y bit, and n is a number designating the time of occurrence of the $n$th bit, comprising, a plurality of connected multiplier cells, each of said cells corresponding to a multiplicand bit position, each cell being substantially identical and having input means for receiving a parallel input multiplicand bit $X_m$, a serial input multiplier bit $Y_n$, and a partial product bit from an adjoining higher order cell, $S_{m+1,n-1}$, each cell further having first circuit means for forming a borrow-carry bit, $C_{m,n}$ and second circuit means for forming a partial product bit, $S_{m,n}$, said first and second circuit means including logic gate means and storage means arranged in a configuration with respect to said carry-borrow bit $C_{m,n}$ as defined by the equation:

$$C_{m,n} = ((X_m \cdot (Y_n \oplus Y_{n-1})) \oplus C_{m,n-1}) \cdot (S_{m+1,n-1} \oplus Y_n)$$

and with respect to said partial product bit $S_{m,n}$ as defined by the equation:

$$s_{m,n} = S_{m+1,n-1} \oplus C_{m,n-1} \oplus (X_m \cdot (X_n \oplus Y_{n-1}))$$

said cell having means for outputting said partial product but $S_{m,n}$

2. The apparatus of claim 1 including a cell corresponding to the most significant bit position with means for multiplication of both signed and unsigned numbers.

3. The apparatus of claim 2 wherein said means for multiplication of both signed and unsigned numbers includes exclusive-or gate means having as one input a mode control and as another input an incoming sum signal and having an output connected to said first circuit means of the most significant bit cell position, said exclusive-or gate means for inverting said incoming sum signal thereby placing a negative arithmetic weight on the X input.

4. The apparatus of claim 1 wherein said first circuit means includes a second storage means for receiving said carry-borrow bit $C_{m,n}$ from said logic gates forming $C_{m,n}$, said second storage means having an output bit $C_{m,n-1}$, connected to said logic gates forming both $C_{m,n}$ and $S_{m,n}$.

5. The apparatus of claim 1 wherein said means for outputting said partial product bit $S_{m,n}$ of each of a number of said cells is connected to said first and second circuit means of an adjoining cell corresponding to a lower order bit position thereby forming a multicell unit.

6. The apparatus of claim 5 wherein all cells in each multicell unit are identical except for the most significant bit cell of the unit.

7. The apparatus of claim 5 wherein multicell units are connected together with the partial product bit from a cell corresponding to the least significant bit position of a first multicell unit connected to said first and second circuit means of a cell corresponding to the most significant bit position of a second multicell unit, said second multicell unit receiving lower order parallel $X_m$ inputs relative to said first multicell unit.

8. A digital multiplier of the type taking a numerical multiplier serially, with multiplier bits in two's complement notation, numbered in a time interval hierarchy as follows, $Y_N, \ldots, Y_{n+1}, Y_n, Y_{n-1}, \ldots Y_1, Y_0$, where N is a number designating the time of occurrence of the most significant Y bit, and n is a number designating the time of occurrence of the $n$th bit, said digital multiplier taking multiplicand bits in parallel, with multiplicand bits in two's complement notation, numbered in a bit position hierarchy as follows, $X_M, \ldots, X_{m+1}, X_m, X_{m-1}, \ldots X_1, X_0$ where M is a number designating the position of the most significant X bit, m is a number designating the position of the $m$th bit, and 0 is a number designating the position of the least significant X bit comprising, a. a first input means for receiving a serial stream of multiplier bits, $Y_N, \ldots, Y_n, \ldots Y_0$ presented in time least significant bit first, b. first logic gate means connected to said first input means, having an input for receiving said serial multiplicand bit stream and first storage means connected to said input, said first logic gate means forming the intermediate term $Y_n \oplus Y_{n-1}$, and having a first output means for transmitting said intermediate product, c. at least one multiplier cell connected to said first output means and said first input means, said cell including:

i. second input means for receiving a multiplier bit, $X_m$, ii. a third input means for receiving a partial product bit, $S_{m+1,n-1}$, where m+1 indicates a cell position origin and $n-1$ indicates a time of origin of said partial product sum bit, iii. first circuit means connected to said second and third input means and having second logic gate means for logically combining said intermediate term, $Y_n \oplus Y_{n-1}$, with said multiplicand bit, $X_m$, and said partial product bit, $S_{m+1,n-1}$ into a borrow-carry bit, $C_{m,n}$, said second logic gates terminating in a borrow-carry bit output connected to a second storage means having an output bit designated $C_{m,n-1}$, wherein said second logic gates are arranged in combination with respect to said borrow-carry bit $C_{m,n}$ as defined by the equation:

$$C_{m,n} = ((X_m \cdot (Y_n \oplus Y_{n-1})) \oplus C_{m,n-1}) \cdot (S_{m+1,n-1} \oplus Y_n)$$

iv. second circuit means connected to said second and third input means and to said output of said second storage means and having third logic gate means for logically combining said intermediate term $Y_n \oplus Y_{n-1}$, with said multiplicand bit $X_m$, said partial product sum bit, $S_{m+1,n-1}$ and said stored borrow-carry bit $C_{m,n-1}$ into a new partial sum bit, $S_{m,n}$, wherein said second logic gates are arranged in combination with respect to new partial product bit $S_{m,n}$ as defined by the equation:

$$S_{m,n} = S_{m+1,n-1} \oplus C_{m,n-1} \oplus (X_m \cdot (Y_n \oplus Y_{n-1})),$$ and v. a second output means connected to said third circuit means for transmitting said new partial product bit, $S_{m,n}$.

9. The apparatus of claim 8 wherein a plurality of multiplier cells are connected with the second output means of each higher order cell connected to a respective third input means of a neighboring lower order cell.

10. The apparatus of claim 8 further including clock means connected to said first, second and third storage means.

11. The apparatus of claim 8 including, in a cell corresponding to the most significant bit position, means for multiplication of both signed and unsigned numbers.

12. The apparatus of claim 11 wherein said means for multiplication of both signed and unsigned numbers includes exclusive-or gate means having as one input a mode control and as another input an incoming sum signal and having an output connected to said first circuit means of the most significant bit cell position, said exclusive-or gate means for inverting said incoming sum signal thereby placing a negative arithmetic weight on the X input.

* * * * *